United States Patent
Zimmermann et al.

(10) Patent No.: US 8,393,680 B2
(45) Date of Patent: Mar. 12, 2013

(54) KIT FOR SEAT ROWS IN AIRCRAFT

(75) Inventors: Peter Zimmermann, Markdorf (DE);
Ulf Soetebier, Friedrichshafen (DE);
Frank Isele, Horgenzell (DE); Jürgen Grünberg, Ravensburg (DE)

(73) Assignee: Zim GmbH, Markdorf (DE)

( * ) Notice: Subject to any disclaimer, the term of this patent is extended or adjusted under 35 U.S.C. 154(b) by 0 days.

(21) Appl. No.: 12/940,193

(22) Filed: Nov. 5, 2010

(65) Prior Publication Data

US 2011/0101162 A1     May 5, 2011

Related U.S. Application Data

(63) Continuation of application No. PCT/EP2009/003262, filed on May 7, 2009.

(30) Foreign Application Priority Data

May 7, 2008   (DE) .................... 10 2008 022 671
Aug. 22, 2008  (DE) .................... 10 2008 039 262

(51) Int. Cl.
*A47C 15/00* (2006.01)
*A47B 97/00* (2006.01)
(52) U.S. Cl. .............. 297/257; 297/248; 297/463.1
(58) Field of Classification Search .............. 297/232, 297/248, 257, 440.1, 440.14, 463.1, 463.2; 248/72, 74.1, 74.4, 214, 230.1, 230.5, 231.61; 403/190, 191, 196
See application file for complete search history.

(56) References Cited

U.S. PATENT DOCUMENTS

| | | | | |
|---|---|---|---|---|
| 2,651,767 A * | 9/1953 | Bergan | .......................... | 439/804 |
| 3,003,646 A * | 10/1961 | Wolf | .............................. | 211/107 |
| 3,785,600 A * | 1/1974 | Padovano | .................. | 248/188.1 |
| 4,229,040 A | 10/1980 | Howell et al. | | |
| 4,375,300 A * | 3/1983 | Long et al. | .................... | 297/232 |
| 5,069,505 A | 12/1991 | Amthor et al. | | |
| 5,409,186 A * | 4/1995 | Chow | ........................ | 244/122 R |
| 5,553,923 A * | 9/1996 | Bilezikjian | ................ | 297/452.2 |
| 5,673,973 A * | 10/1997 | Marechal | .................. | 297/452.4 |
| 5,727,762 A * | 3/1998 | Cosentino | ............... | 248/231.61 |
| 6,406,003 B1* | 6/2002 | Shaw | .............................. | 256/36 |
| 6,478,256 B1 | 11/2002 | Williamson | | |
| 6,776,457 B2* | 8/2004 | Muin et al. | .................... | 297/331 |
| 2003/0084838 A1 | 5/2003 | McCandish et al. | | |
| 2003/0094542 A1 | 5/2003 | Williamson | | |
| 2003/0094842 A1 | 5/2003 | Williamson | | |

FOREIGN PATENT DOCUMENTS

| | | |
|---|---|---|
| DE | 76 28 789 U1 | 2/1978 |
| DE | 39 18 500 A1 | 12/1990 |
| DE | 43 37 938 C1 | 5/1995 |
| DE | 20 2008 006 304 U1 | 11/2008 |
| JP | 10053048 * | 2/1998 |

* cited by examiner

*Primary Examiner* — David Dunn
*Assistant Examiner* — Philip Gabler
(74) *Attorney, Agent, or Firm* — Burr & Brown

(57) ABSTRACT

In seat rows, in particular in aircraft, the individual seats thereof being able to be adjusted in their usable seat width, and comprising seat dividers with support legs, which are held by spars running transversely to the seat direction, at least one seat divider may be adjusted in the direction of the spars.

15 Claims, 3 Drawing Sheets

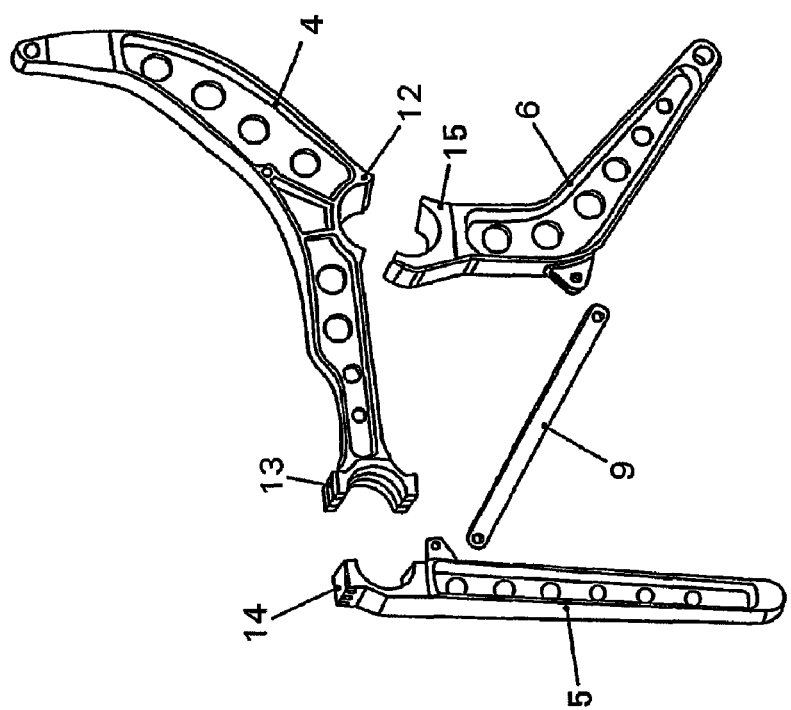
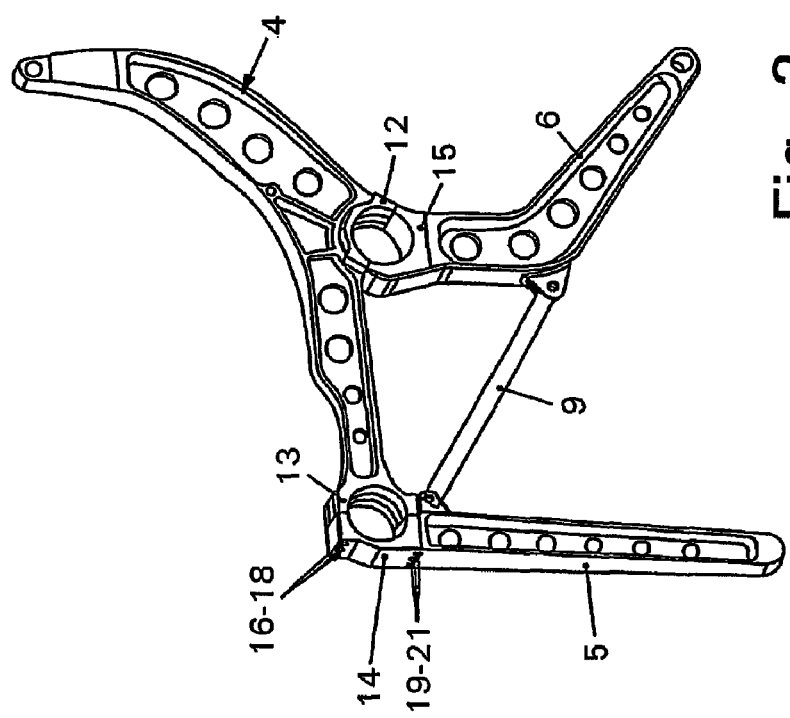

KIT FOR SEAT ROWS IN AIRCRAFT

CROSS REFERENCE TO RELATED APPLICATIONS

This application is a continuation of International Application No. PCT/EP2009/003262 filed May 7, 2009, which designated the United States, and claims the benefit under 35 USC §119(a)-(d) of German Application No. 10 2008 022 671.8 filed May 7, 2008 and German Application No. 10 2008 039 262.6 filed Aug. 22, 2008, the entireties of which are incorporated herein by reference.

FIELD OF THE INVENTION

The invention relates to seat rows, in particular in aircraft, the individual seats thereof being able to be adjusted in their usable seat width, and comprising seat dividers and support legs, which are held by spars running transversely to the seat direction.

BACKGROUND OF THE INVENTION

It is known from DE 39 18 500 C2 to fasten the seat divider or even the seat foot to a supporting tube. The seat foot is fastened by means of a tensioning strap to the supporting tube and the seat divider is fastened in the front region by means of a profiled tube and screw connections.

For example, disclosed in German Utility Model No. 76 28 789 U1 is a so-called aircraft passenger seat row with individual backrests and side parts, defined laterally by seat dividers, which side parts are carried by a common seat frame which comprises at least two spars extending parallel to one another and running in the transverse seat direction, configured as tubes, to which feet are fixedly connected and at least one portion of the seat dividers is adjustably connected in the longitudinal direction of the spars.

Generally, an adaptation to the respective configuration of the aircraft fuselage is carried out where the seat dividers and the seat legs are displaceable along the spars and connected thereto either via a lever hub principle or by a direct positive connection. In this type of connection, there is the drawback that when the seat leg comes into contact with the seat divider, specific parts or connection adapters are necessary.

SUMMARY OF THE INVENTION

In this case, the object underlying the invention is to develop and/or to improve such known aircraft passenger seat rows such that an adaptation of the width of individual seats may be achieved with the smallest number of different parts and also possible contact of the seat leg may be made with the seat divider without additional parts but still with sufficient stability.

Preferably, the connection between the seat divider and spar is achieved by applying the disk hub principle. At the points where the seat dividers and seat legs come into contact, these parts are connected directly according to the disk hub principle. At all other points, clamping parts are used in order to implement the disk hub principle.

This type of connection requires at the points of contact a relatively small module which advantageously may be easily encompassed by the respective upholstery of the seats so that, for example, a narrowing of the usable seat width is not immediately obvious to the regular observer. If there is no contact, a stepless adaptation is possible.

According to the present invention, in practice it has proved advantageous if the seat dividers together with the support legs are fastened to the spars according to the disk hub principle, this type of disk hub connection being able to be formed by corresponding disk hub halves.

In this case, it is expedient if the disk hub halves are provided, on the one hand, on the seat dividers and, on the other hand, on the support legs and the width of the disk hub halves of the support legs is a multiple of the width of the disk hub halves of the seat dividers.

In this connection, it has been shown that as a suitable measurement of the width of the disk hub halves of the support legs, three times the width of the disk hub halves of the seat dividers is sufficient in order to obtain a sufficient adaptation of the width.

The disk hub halves may preferably be connected together by means of screws, which are also arranged to be easily accessible according to the modular principle according to the invention.

In the case where the individual disk hub halves are configured with variable widths, for reasons of stability it may be expedient if the difference in width between the disk hub halves of the seat dividers and of the support legs is compensated by individual, separate disk hub halves. In this connection it is expedient if the individual disk hub halves have the same width as the disk hub halves attached to the seat dividers. Thus a uniform size of module is obtained.

The fastening of the individual, separate disk hub halves to the disk hub halves of the support legs may also be carried out by screws which correspond to those for the connection of the seat dividers to the support legs.

Included in the invention is also a corresponding seat row and the use of a corresponding kit for producing this seat row. Moreover, the individual seat dividers and seat legs together with one respective disk hub half are also included in the invention.

Mandatory crash tests, in particular, also have to be taken into account.

The preforming of the floor required by the approved regulations, in this case known as pitch and roll, provides a very high level of pretensioning in the primary structure of the seat, in particular in the supporting tubes, seat dividers and seat legs. With the predetermined pitch and roll, on the one hand, one seat rail is displaced downwards by a predetermined value and the other seat rail is additionally rotated by a specific angle. This pretensioning is superimposed by the actual load of a 16 G crash load case. A reduction of the pretensioning leads to more reliable proof of compliance and/or permits a more lightweight design of the primary structure.

In the known solutions, the connection of the seat legs to the supporting tubes takes place positively or by a wide clip-like clamping connection or by connecting elements, such as screws, rivets or bolts. Consequently, flexibility as a result of slipping due to deformation is hardly present or not present at all. A reduction of the pretensioning due to deformation is, as a result, not possible or only possible to a limited extent.

According to the present invention, the supporting tubes are connected via half-shells to the seat legs. In this connection, frictional values defined by the half-shell design may be set, in order to permit the slipping of the supporting tube at least to the smallest extent, in the case of pitch and roll. Moreover, each of the half-shells present is individually screwed and thus individually deformable and flexible per se, so that due to a flexibility of the individual half-shells, as a result of the load, an optimal slipping of the supporting tubes and thus an unloading of the seat structure is ensured.

Advantageously, in each case the through-holes should be in the half-shells and the associated thread in the seat foot/seat divider. By the construction of the multiple half-shells it is possible that the half-shells may move relative to one another. Thus, on the one hand, a very stable connection is achieved, which however at the same time permits a flexibility and relative movement which is defined to a certain extent. By the pretensioning by means of a predetermined screw tightening torque, a non-positive and frictional connection is made which, however, in the case of pitch and roll also permits a certain flexibility, even before it could lead to failure of the structural components, and to a certain extent even has a specific restoring capacity in order to deform but not break the components.

The modular design according to the present invention permits this. Different offset solutions do not have to be provided, but all the usual seating configurations may be set and also easily produced and assembled.

BRIEF DESCRIPTION OF THE DRAWINGS

Further features and advantages of the present invention are revealed from the following description of an exemplary embodiment in combination with the drawings.

FIG. 2 shows a simplified, perspective view of a screwed-together component, consisting of a seat divider with two support legs in an enlarged scale;

FIG. 3 shows a side view of the component according to FIG. 2 as an exploded view.

DETAILED DESCRIPTION OF THE INVENTION

Figure 1:
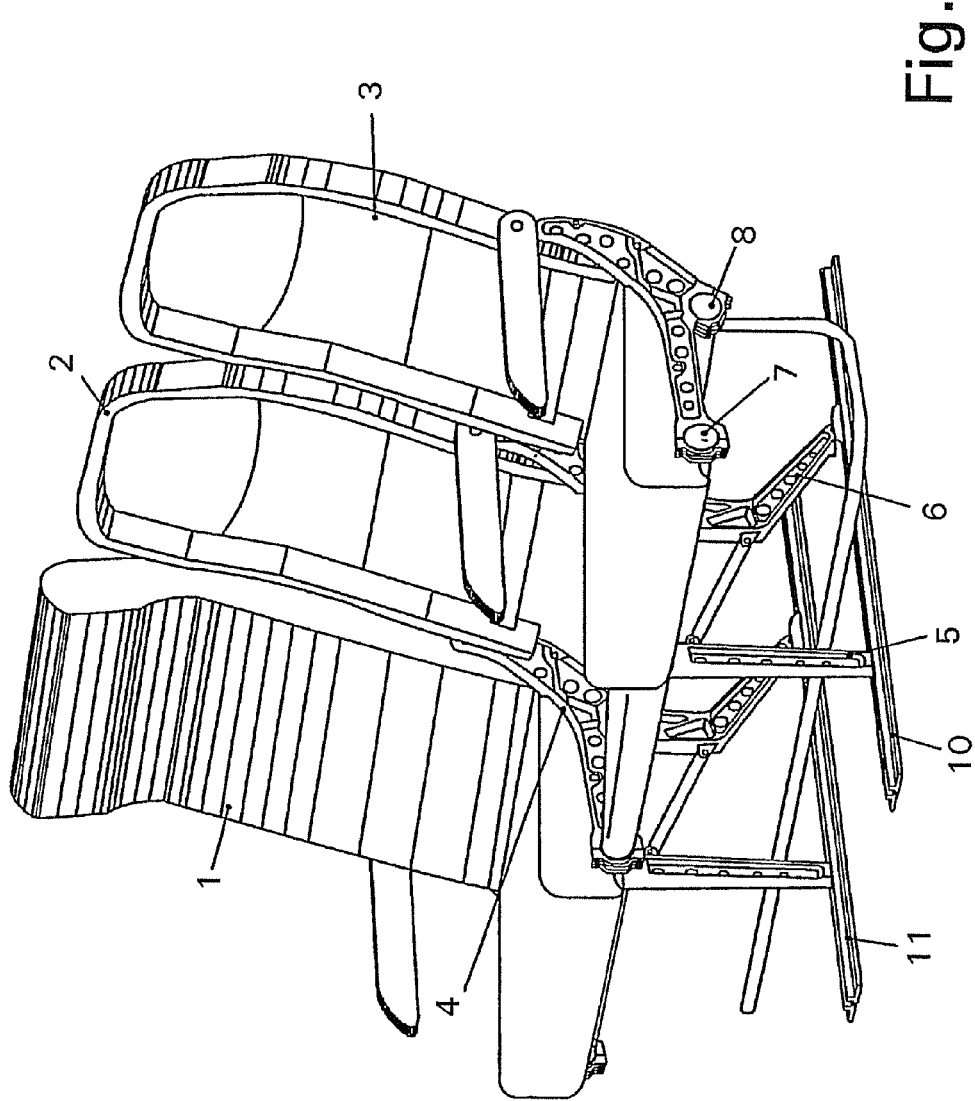
FIG. 1 shows a simplified, perspective view of an aircraft passenger seat row with three seats, which have different degrees of finishing.

The seat row comprising three seats, shown by way of example in FIG. 1, in particular for installing in aircraft, shows a seat 1 complete with upholstery, to the right thereof a seat 2 where the upholstery is still absent and a seat 3 on which only one seat cushion rests.

Between the seats 1-3 are located identical seat dividers 4 which are connected together by identical support legs 5 and 6 according to the principle of a disk hub connection with tubular spars 7 and 8 running transversely to the seat direction and extending parallel to one another. Moreover, the support legs 5 and 6 are supported against one another by a strut 9 (see FIG. 2).

The support legs 5 and 6 on both sides of the central seat 2, which are guided in floor rails 10 and 11, carry substantially the same seat row consisting of the seats 1-3.

In FIG. 2 the load-bearing component consisting of the seat dividers 4, the support legs 5 and 6 as well as the strut 9 are shown screwed-together, while in FIG. 3 the individual parts of the load-bearing component are shown not screwed-together, in an exploded view. It is essential in this case that each seat divider 4 has two connecting regions in the form of disk hub halves 12 and 13 which are connected together with corresponding disk hub halves by screws (i.e., fasteners), firstly at the upper end of the front support leg 5—denoted by 14—and secondly at the upper end of the rear angled support leg 6—denoted by 15—which are additionally connected together by screws according to FIG. 2.

Figure 4B:
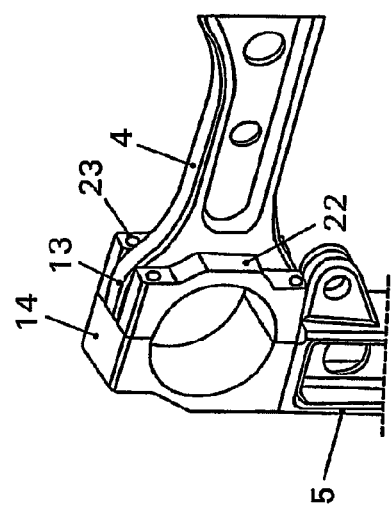
FIGS. 4a)-4d) show four simplified, perspective views of the connecting region of the front support leg/seat divider of the component according to FIG. 2 in four different positions for altering a seat width.
Figure 4D:
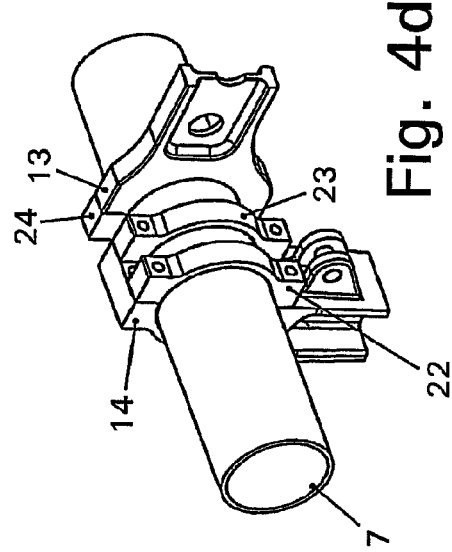
Figure 4A:
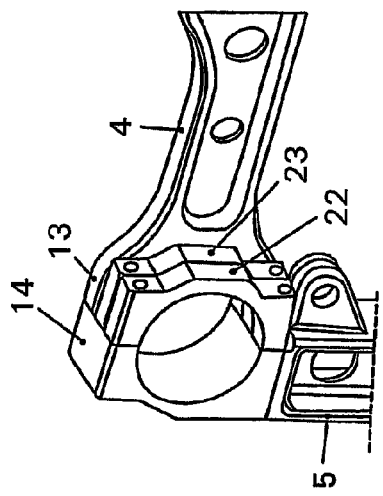
Figure 4C:
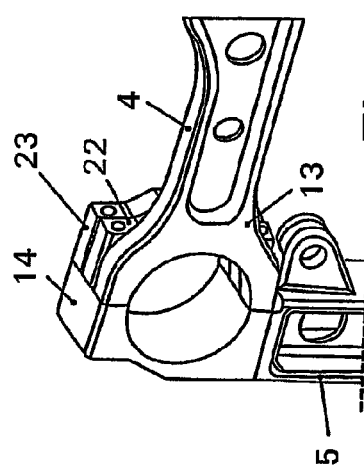

In FIG. 2, a disk hub connection is illustrated consisting of the disk hub halves 13 and 14 according to the illustration FIG. 4c). Here it may be seen clearly that in each case three upper and three lower screws 16-18 and/or 19-21 are used. This is because in this exemplary embodiment the width of the disk hub half 14 of the support leg 5 is three times the width of the disk hub half 13 of the seat divider 4, and the difference in width between the respective disk hub halves 13 and 14 has been compensated by two individual separate disk hub halves 22 and 23, the respective width thereof corresponding to the width of the disk hub halves 13.

By these incremental widths of the disk hub half 13, 14, 22 and 23 advantageously a relatively precise module is obtained for adjusting the usable seat width. At the same time, the individual, separate disk hub halves 22 and 23 increase the stability of the respective disk hub connection as the support leg always stands vertically.

With reference to FIGS. 4a)-4d), it is explained hereinafter how, for example, the usable seat widths of the seats 1-3 of the seat row shown in FIG. 1 may be adjusted in a simple manner, the disk hub connections shown in FIGS. 4a)-4d) respectively relating to the connection 13/14 in the front seat region, whereas the disk hub connection 12/15 in the rear seat region is handled similarly and/or accordingly shifted at the same time or immediately after the connection 13/14.

In FIG. 4a) the seat divider 4 is screwed with its disk hub 13, which is narrower relative to the disk hub 14, right-aligned to the disk hub 14, and the difference in width is compensated by the individual separate disk hub halves 22 and 23, which are also screwed to the disk hub half 14, the spar 7 around which the connection is clamped has been omitted from the drawings.

If the usable seat width is now to be increased and/or altered, the arrangement according to FIG. 4b) comes to bear, for example, where the seat divider 4 has been placed in the middle of the disk hub half 14 and at the same time the two individual disk hub halves 22 and 23 have been placed on both sides of the seat divider 4.

The example in FIG. 4c) shows a further alteration to the width, in which the disk hub half 13 of the seat divider 4 has been shifted, left-aligned with the disk hub half 14, and at the same time the difference in width on the right has been filled by the separate disk hub halves 22 and 23 arranged adjacent to one another.

The example in FIG. 4d) shows a further alteration to the width, in which there is no contact between the disk hub half 13 of the seat divider and the disk hub half 14 of the support leg. In this case, the disk hub halves are closed by the disk hub halves 22, 23 and the disk hub half 13 is connected to the spar 7 by a further separate disk hub half 24.

Overall, therefore, the kit according to the invention provides a plurality of possible structural variations, in particular in aircraft passenger seat rows, as firstly said kit comprises only a relatively small number of components and secondly, these components may be relatively easily handled, the requirement for stability being ensured at the same time.

LIST OF REFERENCE NUMERALS

1 Seat
2 Seat
3 Seat
4 Seat divider
5 Support leg
6 Support leg
7 Supporting rail
8 Supporting rail 9 Strut
10 Floor rail
11 Floor rail
12 Disk hub half
13 Disk hub half
14 Disk hub half
15 Disk hub half
16 Screw
17 Screw
18 Screw
19 Screw
20 Screw
21 Screw
22 Disk hub half
23 Disk hub half

We claim:

1. A seat row for an aircraft, the individual seats thereof being adjustable in their usable seat width and comprising seat dividers with support legs that are held by spars running transversely to a seat direction, wherein at least one seat divider is adjustable in the direction of the spars, wherein the seat divider with the support leg is fastened to at least one spar by a disk hub connection formed by corresponding disk hub halves, wherein end faces of the disk hub halves extend radially with respect to a central axis of the spar and abut one another, and wherein the disk hub halves are connected together by fasteners positioned entirely outside the spars and extending perpendicularly to the end faces of the disk hub halves.

2. The seat row as claimed in claim 1, wherein one disk hub half is provided on the seat divider and one disk hub half is provided on the support leg.

3. The seat row as claimed in claim 2, wherein the width of the disk hub half of the support leg is a multiple of the width of the disk hub half of the seat divider.

4. The seat row as claimed in claim 3, wherein the width of the disk hub half of the support leg is three times the width of the disk hub half of the seat divider.

5. The seat row as claimed in claim 2, further comprising at least one additional disk hub half positioned adjacent to at least one of the disk hub half of the support leg and the disk hub half of the seat divider.

6. The seat row as claimed in claim 2, wherein a difference in width between the disk hub half of the seat divider and the disk hub half of the support leg is compensated for by additional, separate disk hub halves.

7. The seat row as claimed in claim 6, wherein the additional, separate disk hub halves have the same width as the disk hubs attached to the seat dividers.

8. The seat row as claimed in claim 2, wherein the disk hub halves are connected together by connecting elements.

9. The seat row as claimed in claim 6, wherein the additional, separate disk hub halves are fastened individually by connecting elements to at least one of the disk hub halves of the support legs and of the seat divider.

10. The seat row as claimed in claim 1, wherein the disk hub halves are joined together to at least one of move and yield, in the event of a crash, at least to some extent relative to the spar.

11. The seat row as claimed in claim 1, wherein disk hub halves for the seat divider and the support leg consist of a corresponding interior shape.

12. A seat divider for individual seats in an aircraft, which seats are adjustable in their usable seat width and are held on spars running transversely to a seat direction, wherein the seat divider is fastened to at least one spar by a disk hub connection formed by corresponding disk hub halves, wherein end faces of the disk hub halves extend radially with respect to a central axis of the spar and abut one another, and wherein the disk hub halves are connected together by fasteners positioned entirely outside the spars and extending perpendicularly to the end faces of the disk hub halves.

13. The seat divider as claimed in claim 12, wherein the disk hub connection is formed by at least one disk hub half and said disk hub half is associated with the seat divider.

14. The seat row as claimed in claim 3, wherein the width of the disk hub half of the support leg is a multiple of the width of the disk hub of the seat divider, and wherein a width of an upper portion of the support leg is the same as the width of the disk hub half of the support leg.

15. The seat divider as claimed in claim 12, wherein one disk hub half is provided on the seat divider and one disk hub half is provided on the support leg, wherein the width of the disk hub half of the support leg is a multiple of the width of the disk hub of the seat divider, and wherein a width of an upper portion of the support leg is the same as the width of the disk hub half of the support leg.

* * * * *